United States Patent
Maier

[19]

[11] Patent Number: 5,927,943
[45] Date of Patent: Jul. 27, 1999

[54] INLET CASING FOR A TURBINE

[75] Inventor: William C. Maier, Almond, N.Y.

[73] Assignee: Dresser-Rand Company, Corning, N.Y.

[21] Appl. No.: 08/924,758

[22] Filed: Sep. 5, 1997

Related U.S. Application Data

[51] Int. Cl.⁶ .............................. F03B 1/04; F01B 25/02; F04D 15/00; F04D 27/00
[52] U.S. Cl. ......................... 415/167; 415/155; 415/150; 415/157; 415/158; 415/159; 415/165; 415/167; 415/186; 415/191; 415/209.2; 415/202
[58] Field of Search ..................... 415/155, 150, 415/157, 158, 159, 165, 167, 186, 191, 209.2, 202

[56] References Cited

U.S. PATENT DOCUMENTS

| | | |
|---|---|---|
| 732,705 | 7/1903 | Burton . |
| 1,529,632 | 3/1925 | Nagler ..................................... 415/165 |
| 3,522,703 | 8/1970 | Toth . |
| 3,610,770 | 10/1971 | Hendriks ................................. 415/159 |
| 3,861,821 | 1/1975 | Keller et al. . |
| 3,880,549 | 4/1975 | Schrieken ................................ 415/158 |
| 4,111,598 | 9/1978 | Kasuya . |
| 4,269,565 | 5/1981 | Charles et al. . |
| 4,467,217 | 8/1984 | Roussey . |
| 4,529,354 | 7/1985 | Klepesch . |
| 4,592,699 | 6/1986 | Maierbacher . |
| 4,616,975 | 10/1986 | Duncan . |
| 4,840,537 | 6/1989 | Silvestri, Jr. . |
| 5,180,280 | 1/1993 | Honda . |
| 5,215,436 | 6/1993 | Puzyrewski . |
| 5,259,727 | 11/1993 | Quinn .................................... 415/209.2 |
| 5,277,542 | 1/1994 | Nakanishi . |
| 5,547,340 | 8/1996 | Dalton .................................. 415/173.5 |

*Primary Examiner*—F. Daniel Lopez
*Assistant Examiner*—Rhonda Barton
*Attorney, Agent, or Firm*—Nixon, Hargrave, Devans & Doyle LLP

[57] ABSTRACT

A turbine with the improved inlet casing in accordance with the present invention includes a shaft which extends along and rotates about a central axis. The turbine also includes at least one rotor wheel which is mounted on and extends radially outward from the shaft to a radially outermost periphery. A plurality of buckets are arrayed circumferentially around the rotor wheel at the radially outermost periphery. A housing surrounds the rotor wheel and the stationary flow path component. A plurality of nozzle vanes are circumferentially arrayed in the stationary flow path component which is axially spaced from the buckets of the rotor wheel. The nozzle vanes are configured to direct fluid against an upstream side of the buckets and effect rotation of the rotor wheel. Inlet fingers are formed in the housing, with each of the inlet fingers defining a substantially straight passage between the turbine inlet or a control system and the nozzle vanes of the first stationary flow path component. The exhaust end of each of the inlet fingers is located further downstream axially than the inlet end.

19 Claims, 5 Drawing Sheets

DIRECTION OF FLUID FLOW

INLET CASING FOR A TURBINE

FIELD OF THE INVENTION

The present invention relates generally to turbines and, more specifically, to an improved inlet casing for a turbine.

BACKGROUND OF THE INVENTION

Typically, an axial flow turbine includes a rotor, a casing, and one or more turbine stages. Each stage has a stationary and rotational component. The rotational component is a wheel with a plurality of buckets, termed a bucket row, attached to its outer circumference. The wheel or wheels of each stage are co-axially mounted to a shaft which rotates about a first axis, also referred to as the rotational axis of the turbine. The assembly of the shaft and wheels is called the turbine rotor. The stationary flowpath component of the axial turbine stage is typically either a nozzle ring or a diaphragm. A plurality of nozzle passages are formed between nozzle vanes circumferentially arrayed about each stationary flowpath component. The nozzle passages are positioned radially about the first axis to line up with the buckets of the turbine rotor axially behind the nozzle passages.

Each of the constituent parts of the turbine discussed above have an upstream and a downstream side. The upstream side is the side of a part into which the motive fluid enters the object. Similarly, the downstream side is the side of a part where the motive fluid exits. In an axial flow turbine, the upstream and downstream sides are arrayed axially with respect to the rotational or first axis. As shown in FIG. 4C, typically an upstream edge of each nozzle vane is oriented to be approximately in line with the rotational or first axis and thus at an angle of about zero degrees with the rotational or first axis (the x-axis in FIG. 4C is the same as the rotational or first axis). In each stage, a stationary flowpath component is positioned upstream of a wheel assembly.

Typically, motive fluid such as steam, is repeatedly accelerated and directed by the nozzle passages between the nozzle vanes in such a way as to allow the adjacent downstream bucket row to extract energy from it. This energy is manifest as a torque on the rotating rotor and is ultimately available as shaft power from the turbine.

A turbine casing surrounds the turbine stage components. The stationary flowpath components which are diaphragms extend radially inward from the casing to the shaft.

The casing also provides an inlet and exhaust for the motive fluid. The inlet portion of the casing, called the inlet casing, is where the motive fluid initially comes into the turbine. This inlet casing typically has a series of circuitous passages which directs motive fluid to the first stage stationary component. Typically, the first stationary flowpath component is a nozzle ring, instead of a diaphragm. The nozzle ring is a ring shaped plate attached to the downstream face of the turbine inlet casing directly upstream of the first stage blade row.

For many turbine designs the motive fluid flow rate is controlled upstream of the turbine by a flow control device. The flow control device typically includes one or more control valves to control the flow rate and is connected upstream to a centralized source of motive fluid.

A problem with typical prior axial flow turbines is the configuration of the inlet casing. Usually, the motive fluid is directed from the control device to the inlet side of the nozzle ring and is presented to the inlet of the first stage nozzle passages in a purely axial orientation. Examples of such designs are shown in FIG. 5 of U.S. Pat. No. 4,592,699 to Maierbacher, which is herein incorporated by reference, and FIG. 1 of U.S. Pat. No. 4,840,537 to Silvestri, which is herein incorporated by reference. As illustrated in these patents, complex shapes for the inlet casing passages are required to orient the motive fluid in a purely axial orientation. The extra bends or curves in these passages increase the frictional losses in the motive fluid. Thus, less energy is available in the motive fluid for extraction by the turbine.

In some designs this efficiency loss is overcome by increasing the passage cross section areas to lower the average fluid velocities. Unfortunately, this solution requires larger passages which in turn leads to greater wall thickness, so that the bulk and cost of the inlet casing, and therefore the turbine, becomes unfavorable. Additionally, lowering average fluid velocities may not be enough. Even if the turbine has lower average fluid velocities, it may still have regions of locally high velocity, for example tight turns, where frictional losses in the motive fluid are still high.

Another shortcoming related to these prior designs is with the direction of flow upstream of the nozzle ring. Since the motive fluid is flowing in an axial orientation, the nozzle vanes have to both accelerate the fluid and also change its direction from axial to almost tangential (or circumferential) to efficiently convert the energy in the motive fluid in the bucket row following the nozzle vanes. Typically, the nozzle vanes have an inlet angle of about zero degrees with respect to the first or rotational axis and need to turn the motive fluid about seventy-five degrees for proper orientation for transfer to the subsequent row of buckets because of the generally axial nature of the flow of motive fluid from stage to stage inherent in an axial flow turbines. The energy loss in the motive fluid from this turning in the nozzle passage is even larger than in the inlet casing passages because the velocity of the motive fluid in the nozzle passages is much higher.

To reduce the amount of turning required, some turbine designs present the motive fluid to the first stage in a tangential direction with respect to the first or rotational axis, rather than axial direction, such as shown in U.S. Pat. No. 3,861,821 to Keller et al. which is herein incorporated by reference. To a large extent the unnecessary turning in the nozzle passages is eliminated by this design, but a significant swirl chamber between the downstream side of the nozzle passages and the row of buckets is introduced. The swirl chamber can introduce radial non-uniformity in the flow of motive fluid at the upstream side or inlet to the buckets which reduces overall efficiency of the turbine. Further, the additional distance the motive fluid travels in the swirl chamber is relatively long and thus increases the frictional losses in the motive fluid.

Another approach to solving this problem is shown in U.S. Pat. No. 5,215,436 to Puzyrewski, which is herein incorporated by reference. Again, motive fluid flow is directed tangentially into the turbine, but in this case the turbine has no nozzle passages. The absence of nozzle vanes gives less control over motive fluid flow distribution and uniformity, thus introducing more losses in the energy extraction process and reducing overall efficiency of the turbine.

SUMMARY OF THE INVENTION

A turbine with the improved inlet casing in accordance with the present invention includes a shaft, at least one rotor wheel, a plurality of buckets, a housing, an inlet casing, at least one stationary flowpath component, a plurality of nozzle vanes, and at least one inlet finger. The shaft extends along and rotates about a central axis. Each rotor wheel is mounted on and extends radially outward from the central axis to a radially outermost periphery. The plurality of buckets are arrayed circumferentially around the rotor wheel at the radially outermost periphery. The housing surrounds the rotor wheels and the downstream portion of the turbine flowpath. The stationary flowpath component contains a plurality of nozzle vanes and is axially spaced upstream from the buckets of the rotor wheel. The nozzle vanes are configured to direct fluid against an upstream side of the buckets and effect rotation of the rotor wheel. Each inlet finger is positioned in the inlet casing, has opposing first (upstream) and second (downstream) ends and defines a substantially straight passage between the first and second ends. The second end of each of the inlet fingers is positioned against an upstream side of the nozzle vanes. The second end of each of the inlet fingers is located further downstream axially than the first end of each of the inlet fingers. Additionally, the second ends of each of the inlet fingers may be positioned side by side, circumferentially, to extend substantially around the complete circumference of the stationary flowpath component. The circumferential extent of the second end of each inlet finger should be limited to ninety degrees of arc or less to maintain the straiqhtness a of the passage in the inlet finger (AS SHOWN IN FIG. 3A). Further, each of the nozzle vanes may be mounted in the stationary flowpath component to have an inlet angle of thirty degrees or less with respect to the rotational axis. The cross-sectional shape of the inlet fingers transitions from circular at the first end to an annular segment matching the radial extents of the nozzle passages of the stationary flowpath component. The circumferential width of the annular segment varies depending on the number of fingers and the desired amount of active admission arc in the stationary flowpath component.

The turbine with the improved inlet casing in accordance with the present invention provides several advantages. For example, in this turbine the motive fluid loses less kinetic energy passing from the control valves to the nozzle vanes because of the short length and straightness of the inlet fingers. As a result, the turbine is more efficient than prior turbines. Additionally, the motive fluid is directed at the nozzle vanes at a more advantageous angle. Improving the angle at which the motive fluid strikes and passes by the nozzle vanes reduces losses in the nozzle passages. Further, the manufacture of the nozzle ring is easier and less expensive than prior designs because with this design the nozzle vanes have to turn the flow less and are therefore straighter and shorter. This reduction in the inlet angle for the nozzle vanes reduces the cost, size, and time required to manufacture the nozzle vanes and the stationary flowpath component in addition to the improved efficiency noted above. The straightness and inherently compact nature of the inlet fingers not only minimize the bulk and cost of the inlet fingers, but also that of the inlet casing as well.

DETAILED DESCRIPTION OF THE INVENTION

Figure 1:
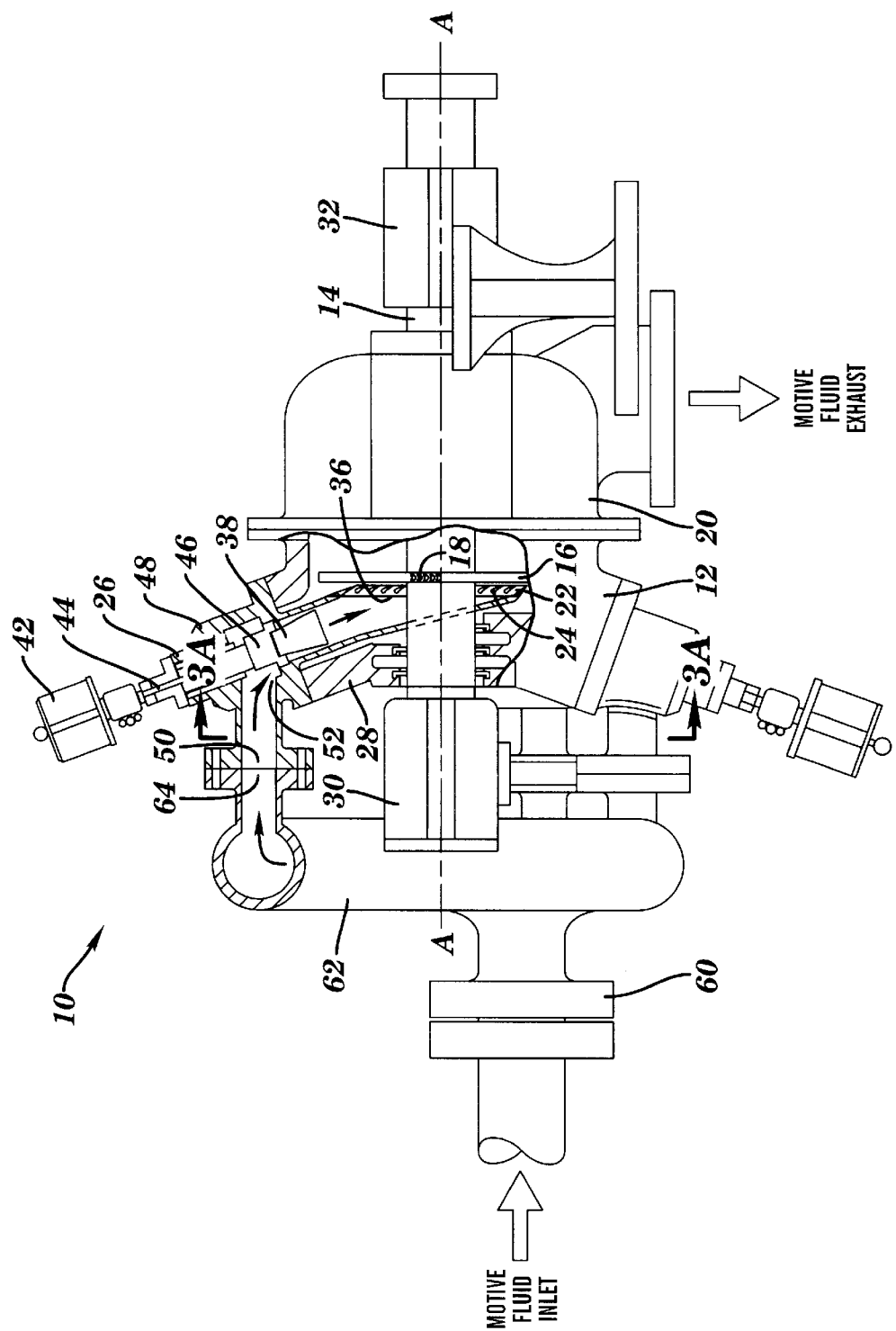
FIG. 1 is a partial cross-sectional, partial broken-away, side view of a turbine with an inlet casing in accordance with the present invention.
Figure 2:
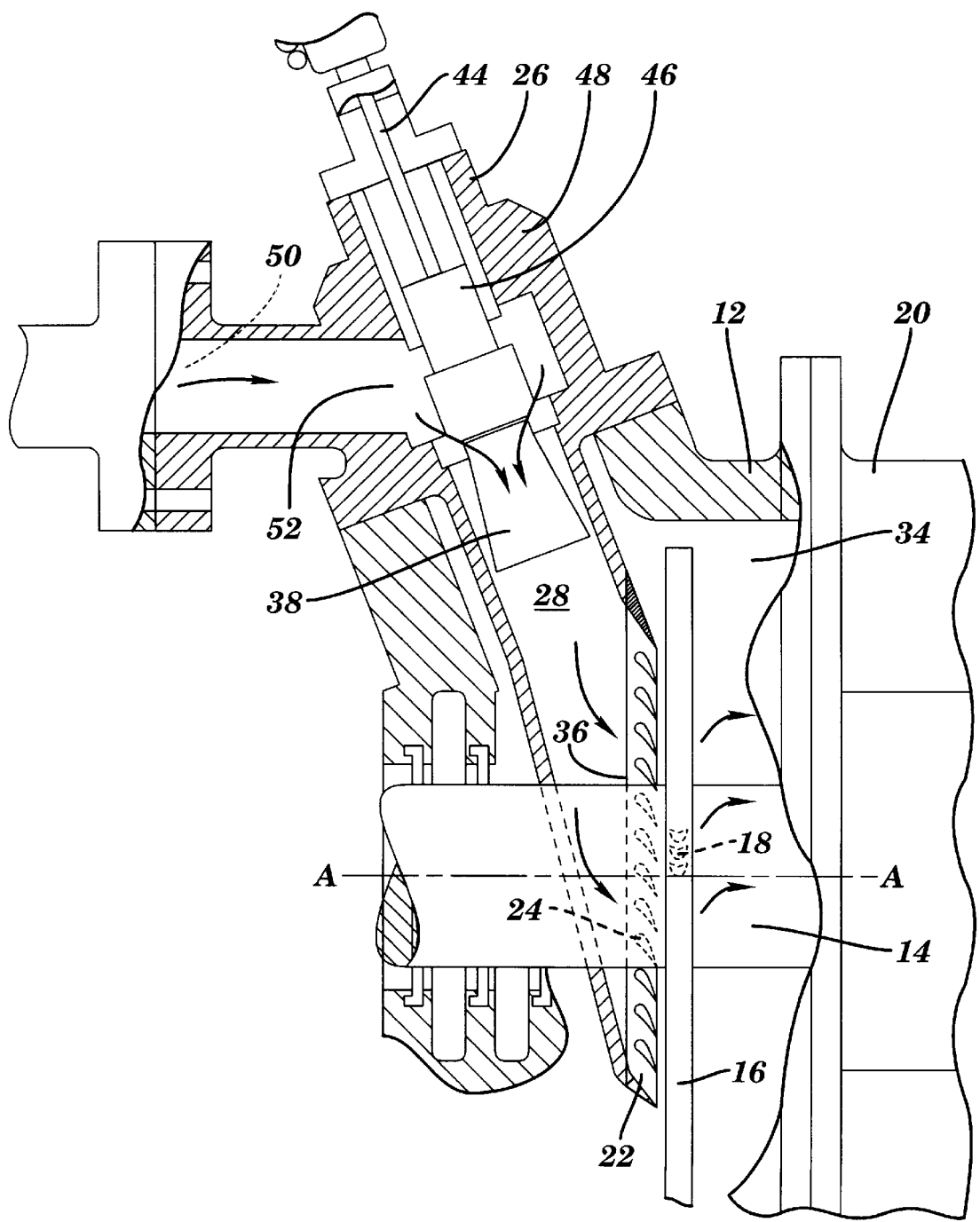
FIG. 2 is an enlarged, partial cross-sectional view of the inlet casing and a partially broken away view of the first stage of the turbine shown in FIG. 1.

A turbine 10 with an improved inlet casing 12 in accordance with the present invention is illustrated in FIG. 1. The turbine 10 includes a shaft 14, at least one rotor wheel 16, a plurality of buckets 18, a housing 20, an inlet casing 12, a stationary flowpath component 22, a plurality of nozzle vanes 24, at least one control system 26, and a plurality of substantially straight inlet fingers 28. The turbine 10 with the improved inlet casing provides several advantages including improving the efficiency of the turbine 10 by adjusting the direction at which the motive fluid impinges on the nozzle vanes 24 and reducing the cost of manufacturing the stationary flowpath component 22 and nozzle vanes 24.

Referring more specifically to FIGS. 1–3C, the shaft 14 extends along and rotates about rotational or first axis A—A. In this particular embodiment, the shaft 14 is supported by a steam end bearing 30 and an exhaust end bearing 32 which are located at opposite ends of the shaft 14.

The rotor wheel 16 is mounted on and extends radially outward from the shaft 14 to a radially outermost periphery. The plurality of buckets 18 are secured to and around the radially outermost periphery of the rotor wheel 16. Although only one rotor wheel 16 shown, the turbine 10 can have more than one rotor wheel 16 mounted on the s haft 14, if needed or desired.

The housing 20 extends around and surrounds a portion of the shaft 14 and each rotor wheel 16 and defines a housing interior 34. The inlet casing 12 encloses an upstream end of the housing interior 34. In this particular embodiment, the inlet casing 12 is fastened to the housing 20 by a bolted joint, although the inlet casing 12 could be fastened to housing 20 by other means such as by welding or by integrally forming inlet casing 12 with housing 20.

Typically, the first Stationary flowpath component 22 is a nozzle ring and subsequent stationary flowpath components 22 downstream from the nozzle ring are diaphragms. The upstream side of the first stationary flowpath component 22 or nozzle ring is connected to the downstream end 36 of each inlet finger 28. In this particular embodiment, the downstream end 36 is bolted to the nozzle ring, although other means to secure end 36 with the nozzle ring could be used such as welding or integrally forming ends 36 with the nozzle ring.

Figure 4A:
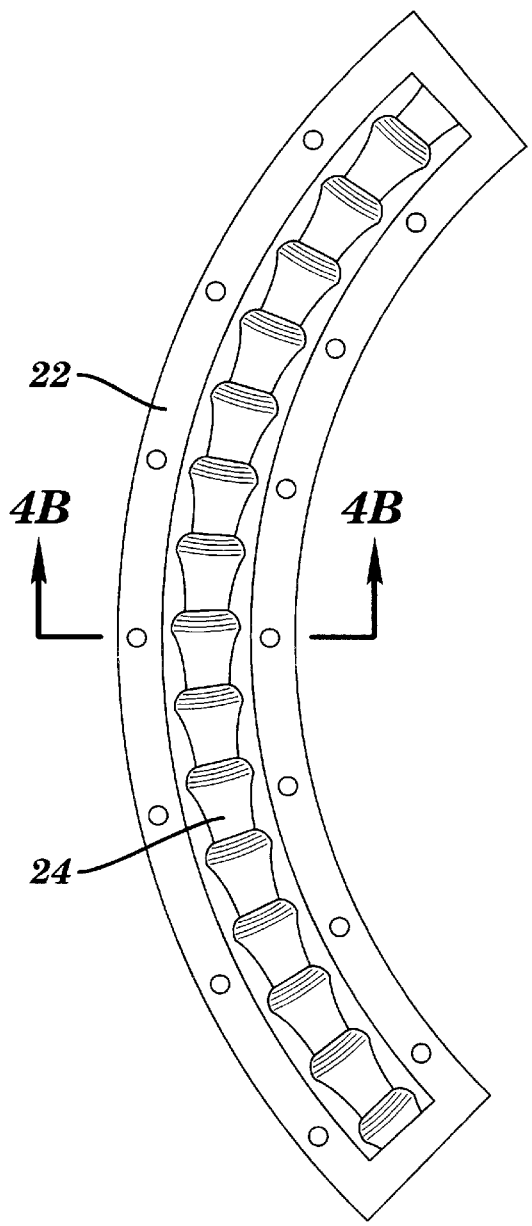
FIG. 4A is an enlarged view of a portion of the axially up-stream side of a segment of the nozzle ring.
Figure 4B:
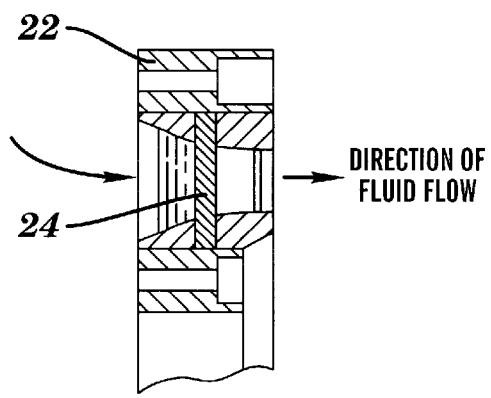
FIG. 4B is a cross-sectional view of a nozzle passage of the nozzle ring taken along line 4B—4B in FIG. 4A.

Nozzle vanes 24 are mounted in the stationary flowpath component 22 at a location so that they are axially spaced upstream of the buckets 18 of rotor wheel 16. The nozzle vanes 24 are spaced apart and are configured to direct motive fluid against an upstream side of the buckets 18 to effect rotation of the rotor wheel 16. A segment of the stationary flowpath component when it is a nozzle ring is illustrated in greater detail in FIGS. 4A–4C.

Figure 4C:
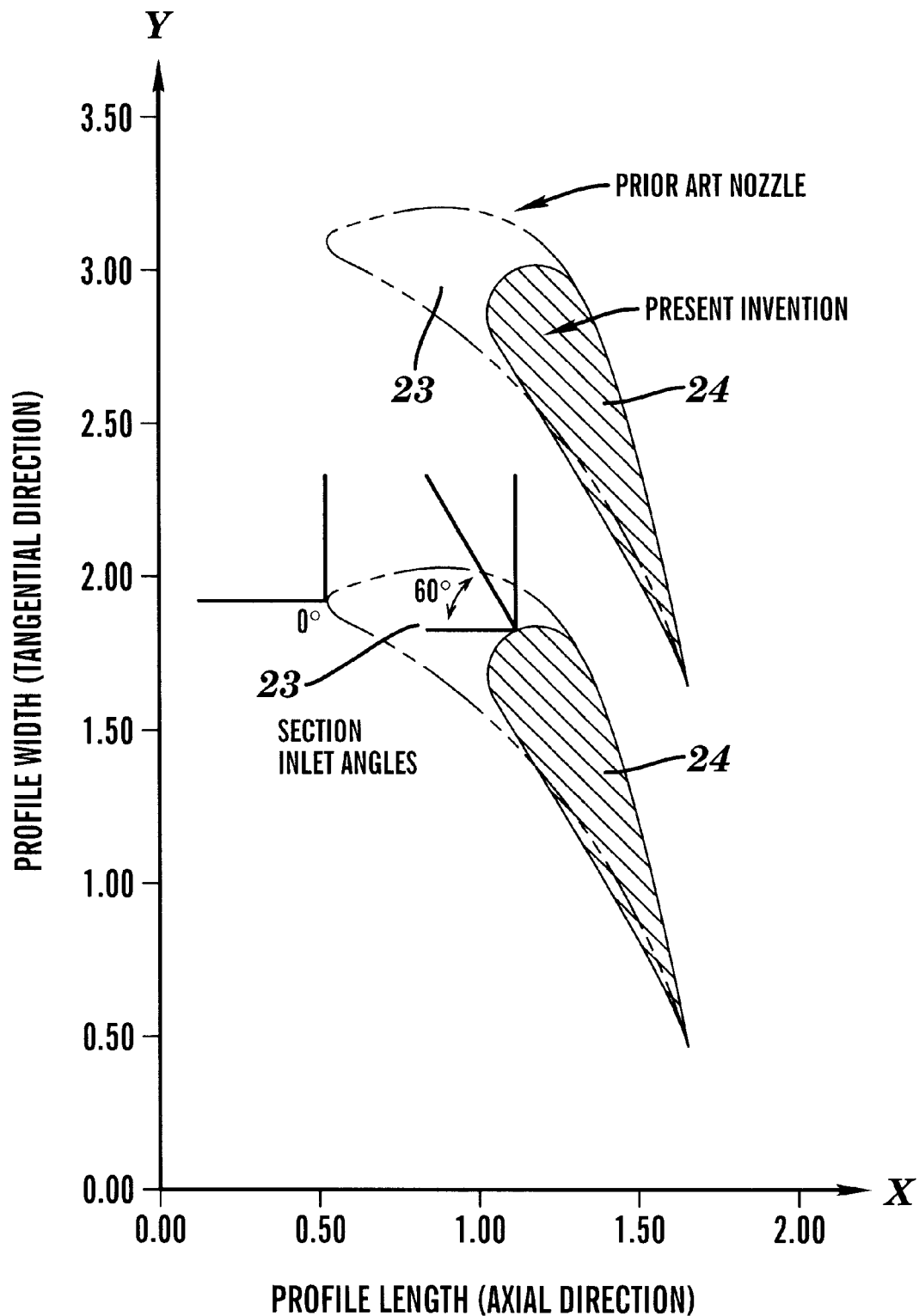
FIG. 4C is a cross-sectional view of a nozzle vane for the turbine in accordance with the present invention and a prior art nozzle vane shown in phantom.

As illustrated in FIG. 4C, traditionally, nozzle vanes 24 are configured to have an inlet angle of zero degrees with respect to the axis A—A. However, with the present invention the nozzle vanes 24 are designed to have an inlet angle of sixty degrees or more with respect to the axis A—A as shown in FIG. 4C. This change in the inlet angle of the nozzle vanes 24 is possible because the inlet fingers 28 direct the fluid at an optimal angle to impinge on the nozzle vanes 24. The optimal angle is achieved because of the substantially straight passage, the positioning of the outlet 36 or second end of the inlet fingers 28 further downstream than the inlet or first end 38 and the positioning of the outlets 36 of the inlet fingers 28 substantially around the circumference of the nozzle vanes 24 so that motive fluid is sent directly into the nozzle vanes 24 at a desired angle. The straightness of the inlet fingers 28 and the reduced turning in the nozzle vanes 24 in the current invention, results in more efficient energy conversion due to less frictional losses.

Additionally, the size of the nozzle vanes 24 can be reduced from prior designs as shown in FIG. 4C. This is also the result of the motive fluid being directed in substantially the optimal direction, by the inlet fingers 28, requiring less turning of the motive fluid by the nozzle vanes 24 and thus enabling smaller nozzle vanes 24 to be used. Reducing the inlet angle and size of the nozzle vanes 24 reduces the time and cost of manufacturing the stationary flowpath components 22.

Referring to FIGS. 1–3C, the inlet fingers 28 are formed in the inlet casing 12 and each have opposing first (upstream) 38 and second (downstream) ends 36. The inlet fingers 28 define a substantially straight passage which extends from the first end 38 to the second end 36. The first end 38 is connected to a control system 26 and the second end 36 is positioned adjacent the nozzle vane 24 upstream edge. The inlet fingers 28 are formed in the inlet casing 12 so the second end 36 is located further downstream axially than the first end 38. Preferably, the turbine 10 has at least four inlet fingers 28, although the turbine 10 could have more or less inlet fingers 28, as needed or desired. The use of more inlet fingers 28 generally would improve the straightness of the inlet passages but no significant improvement occurs after the arc length of the nozzle ring segment 22 is reduced to about 45°. This arc length should not be made much larger than 90°.

Figure 3A:
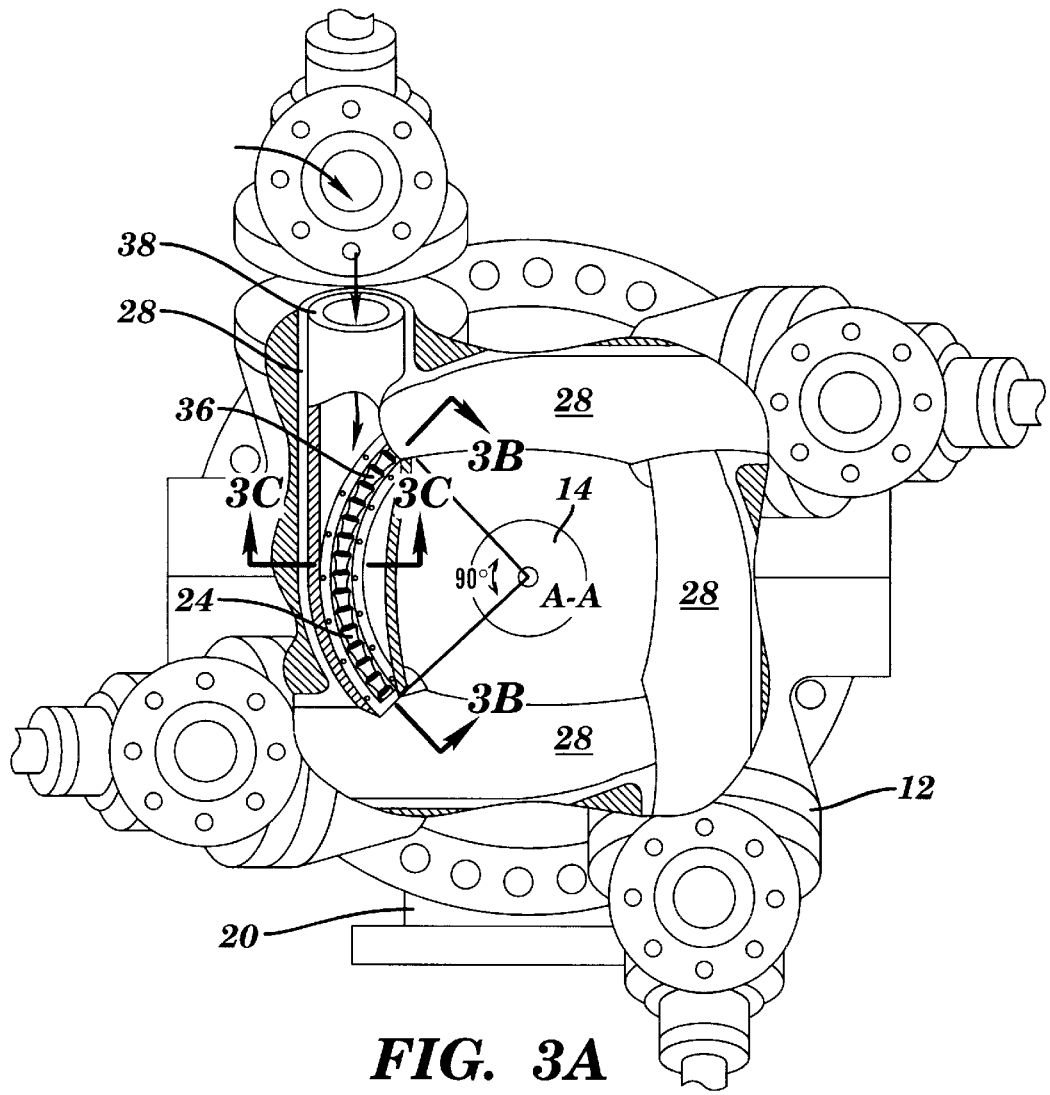
FIG. 3A is a partially broken away, cross-sectional view of the turbine as taken along line 3A—3A in FIG. 1.
Figure 3B:
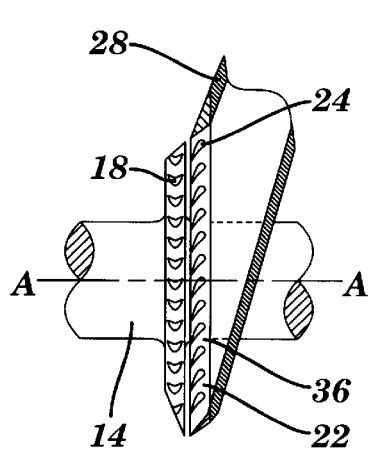
FIG. 3B is a view of the shaft, the nozzle passages of the first stationary component, and the buckets of the first rotor wheel taken along line 3B—3B in FIG. 3A.
Figure 3C:
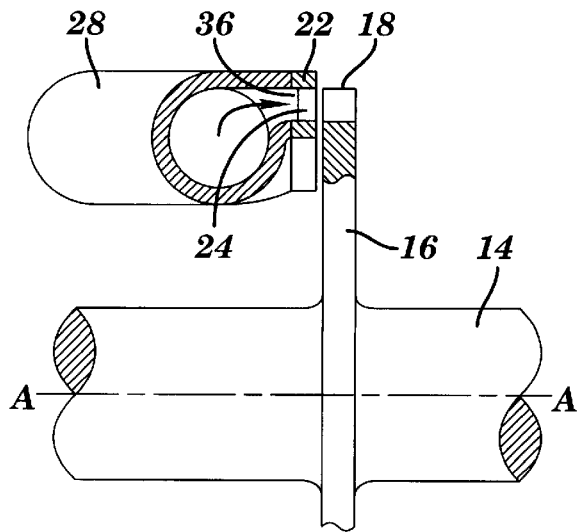
FIG. 3C is a view of the downstream end of one of the inlet fingers, a nozzle passage in the nozzle ring and the first rotor wheel with the buckets taken along lines 3C—3C in FIG. 3A.

As illustrated in FIG. 3A, the second ends 36 of the inlet fingers 28 are positioned substantially around the circumference of the stationary flowpath component 22 adjacent the nozzle vanes 24. As a result, the motive fluid is sent directly from each of the inlet fingers 28 to each of the nozzle vanes 24 without losing kinetic energy in bends, elbows, or in swirl chambers.

In this particular embodiment, each control system 26 includes a control valve actuator 42, a valve rod 44 with a pair of opposing ends, a valve plug 46, and a control valve body 48. The control valve body 48 includes a passage with a pair of openings 50 and 52 at opposite ends. One opening 52 is connected to the first end 38 of one of the inlet fingers 28. The valve plug 46 is connected to one end of the valve rod 44 and is located inside the passage adjacent the first end 38. The other end of the valve rod 44 extends up and is coupled to the control valve actuator 42. Although in this particular embodiment, a separate control system 26 is coupled to the first end 38 of each inlet finger 28, one control system 26 could be coupled to the first end 38 of each inlet finger 28 if needed or desired.

In a manner well known to those skilled in the art, the control valve actuator 42 can be engaged to pull the valve rod 44 out to unseat the valve plug 46 from the first end 38 of the inlet finger 28. The control valve actuator 42 can also be adjusted to control the amount the control valve plug 46 is raised to meter how much motive fluid is allowed to pass into the inlet finger 28.

The inlet 60, of an inlet distribution manifold 62, is coupled to a source of motive fluid, such as steam. In this particular embodiment of the present invention, the outlets 64 of the inlet distribution manifold 62 are each connected to one control system 26 for each inlet finger 28, as shown in FIG. 1.

The operation of the turbine 10 with the improved inlet casing 12 will be illustrated with reference to FIGS. 1–4C. Motive fluid, such as high pressure and temperature steam, is directed from a source of motive fluid (not shown) through the inlet distribution manifold 62 to the control systems 26. The control valve actuator 42 in each control system 26 is engaged to raise the valve rod 44 and thus the valve plug 46 off of the first end 38 of each inlet finger 28.

The motive fluid passes into the inlet fingers 28 via the first end 38 towards the second end 36. Since the inlet fingers 28 are substantially straight, the motive fluid suffers little if any losses as it passes through. Additionally, any kinetic energy remaining in the fluid from the metering process of the control system 26, is directed in a useful direction minimizing throttling losses in the turbine 12.

In some prior turbines, the motive fluid was directed axially with respect to the upstream side or inlet to the nozzle passages for stationary flowpath component 22 (i.e. in a direction substantially parallel to axis A—A through shaft 14) and thus needed to be substantially redirected in the circumferential direction by each of the nozzle vanes 24. This redirection resulted in a loss of energy and thus a loss of efficiency in the turbine. Also, presenting the fluid to the stationary flowpath component 22 inlet axially requires a significant amount of ducting with elbows, bends, and significant passage lengths which add to the energy losses of the turbine. Other prior turbines which used substantially tangential inlets lacked control over the uniformity of motive fluid flow upstream of the buckets 18.

Additionally, with the present invention most of the acceleration of the motive fluid is done by the nozzle vanes 24 of stationary flowpath component 22 which are arrayed close to the upstream side of the first row of buckets 18. This enhances flow uniformity and thus minimizes further losses due to friction or flow non-uniformity which might occur if additional passages intervened, such as a swirl chamber.

Since the motive fluid is directed at the nozzle vanes 24 at an optimal angle, the inlet angle of the nozzle vanes 24 can be increased to 60 degrees or more from axial or axis A—A. This increases in the inlet angle reduces the size and curvature of nozzle vanes 24, and thus makes stationary flowpath components 22 both more efficient and easier and less expensive to manufacture and construct.

Having thus described the basic concept of the invention, it will be readily apparent to those skilled in the art that the foregoing detailed disclosure is intended to be presented by way of example only, and is not limiting. Various alterations, improvements and modifications will occur and are intended to those skilled in the art, though not expressly stated herein. These modifications, alterations and improvements are intended to be suggested hereby, and are within the spirit and scope of the invention. Accordingly, the invention is limited only by the following claims and equivalents thereto.

What is claimed is:

1. A turbine comprising:
    a shaft which extends along and rotates about a central axis;

at least one rotor wheel extending radially outward from the shaft to a radially outermost periphery;

a plurality of buckets arrayed circumferentially around the rotor wheel at the radially outermost periphery;

a housing surrounding the rotor wheels;

a stationary flowpath component upstream of each rotor wheel;

a plurality of circumferentially arrayed nozzle vanes housed in the stationary flowpath component which are axially spaced upstream from the buckets of the rotor wheel and are configured to direct fluid against an upstream side of the buckets and effect rotation of the rotor wheel; and at least one inlet finger formed in the housing, each of the inlet fingers having opposing first and second ends and defining a substantially straight passage between the first and second ends, wherein the second end of each of the inlet fingers is positioned against an upstream side of the nozzle vanes in a circumferential portion of the stationary flowpath component and wherein the second end of each of the inlet fingers is located further downstream axially than the first end of each of the inlet fingers.

2. The turbine as set forth in claim 1 wherein the second ends are positioned side by side to extend substantially around the circumference of the stationary flowpath component adjacent the nozzle vanes and the arc length of each of the circumferential portions of the stationary flowpath component supplied by the second end of one of the inlet fingers is ninety degrees or less.

3. The turbine as set forth in claim 1 wherein the first stationary flow component is integrally formed with the second end of each of the inlet fingers.

4. The turbine as set forth in claim 3 wherein the first stationary flow component is a nozzle ring and the subsequent stationary flow components are diaphragms.

5. The turbine as set forth in claim 1 wherein each of the nozzle vanes is oriented in the stationary flowpath component to have an inlet angle of about sixty degrees or more with respect to the central axis.

6. The turbine as set forth in claim 1 wherein the second ends are positioned side by side to extend substantially around the circumference of the stationary flowpath component adjacent the nozzle vanes.

7. The turbine as set forth in claim 1 further comprising at least one control system, the control system connected to the first end of each of the inlet fingers.

8. The turbine as set forth in claim 7 wherein each of the inlet fingers is connected to a different control system.

9. A turbine comprising:

a rotor comprising a shaft which extends along and rotates about a central axis, at least one rotor wheel extending radially outward from the shaft to a radially outermost periphery, and a plurality of buckets arrayed circumferentially around the rotor wheel at the radially outermost periphery;

a housing surrounding at least a portion of the rotor;

a stationary flowpath component located axially upstream of each of the rotor wheels;

a plurality of nozzle vanes housed in the stationary flowpath component, the nozzle vanes being axially spaced upstream from the buckets of the rotor wheel and configured to direct fluid against an upstream side of the buckets to effect rotation of the rotor wheel;

a plurality of inlet fingers formed in the housing, each of the inlet fingers having opposing first and second ends and defining a substantially straight passage between the first and second ends, wherein the second ends of each of the inlet fingers are positioned against an upstream side of a portion of the nozzle vanes, wherein the second ends of each of the inlet fingers are positioned side by side to extend substantially around the circumference of the stationary flowpath component adjacent the nozzle vanes, and wherein the arc length of each of the circumferential portions of the stationary flowpath component supplied by the second end of one of the inlet fingers is ninety degrees or less.

10. The turbine as set forth in claim 9 further comprising at least one control system, the control system connected to the first end of each of the inlet fingers.

11. The turbine as set forth in claim 10 wherein each of the inlet fingers is connected to a different control system.

12. The turbine as set forth in claim 9 wherein each of the nozzle vanes is oriented in the stationary flowpath component to have an inlet angle of about sixty degrees or more with respect to the central axis.

13. The turbine as set forth in claim 9 wherein the nozzle vanes have a substantially teardrop shape.

14. The turbine as set forth in claim 9 wherein the first stationary flow component is a nozzle ring and the subsequent stationary flow components are diaphragms.

15. A turbine comprising:

a shaft which extends along and rotates about a central axis;

at least one rotor wheel mounted on and extending radially outward from the shaft to a radially outermost periphery;

a plurality of buckets arrayed circumferentially around the rotor wheel at the radially outermost periphery;

a housing defining an interior, the housing surrounding at least the rotor wheels;

at least one stationary flowpath component upstream from the rotor wheel;

plurality of nozzle vanes which are axially spaced from the buckets of the rotor wheel and are configured to direct fluid against an upstream side of the buckets and effect rotation of the rotor wheel, wherein each of the nozzle vanes is mounted in the stationary flowpath component to have an inlet angle of sixty degrees or more with respect to the central axis;

an inlet casing coupled to the interior of the housing at least one inlet finger formed in the inlet casing, each of the inlet fingers having opposing first and second ends and defining a substantially straight passage between the first and second ends, wherein second end is positioned against an upstream side of the nozzle vanes in a circumferential portion of the stationary flowpath component.

16. The turbine as set forth in claim 15 wherein the second ends are positioned side by side to extend substantially around the circumference of the stationary flowpath component adjacent the nozzle vanes and the arc length of each of the circumferential portions of the stationary flowpath component supplied by the second end of one of the inlet fingers is ninety degrees or less.

17. The turbine as set forth in claim 15 further comprising at least one control system, the control system connected to the first end of each of the inlet fingers.

18. The turbine as set forth in claim 17 wherein each of the inlet fingers is connected to a different control system.

19. The turbine as set forth in claim 15 wherein the first stationary flow component is a nozzle ring and the subsequent stationary flow components are diaphragms.

* * * * *